(12) United States Patent
Lai et al.

(10) Patent No.: US 11,851,578 B2
(45) Date of Patent: Dec. 26, 2023

(54) METHOD FOR PREPARING TRANSPARENT FLUORINE-FREE, SUPER-LUBRICATING AND OIL-PROOF COATING

(71) Applicant: FUZHOU UNIVERSITY, Quanzhou (CN)

(72) Inventors: Yuekun Lai, Quanzhou (CN); Jianying Huang, Quanzhou (CN); Weiwei Zheng, Quanzhou (CN); Weilong Cai, Quanzhou (CN)

(73) Assignee: FUZHOU UNIVERSITY, Quanzhou (CN)

( * ) Notice: Subject to any disclaimer, the term of this patent is extended or adjusted under 35 U.S.C. 154(b) by 0 days.

(21) Appl. No.: 18/102,724

(22) Filed: Jan. 29, 2023

(65) Prior Publication Data
US 2023/0242773 A1 Aug. 3, 2023

(30) Foreign Application Priority Data
Jan. 29, 2022 (CN) .......................... 202210111036.1

(51) Int. Cl.
C09D 5/16 (2006.01)
C09D 5/00 (2006.01)
B05D 1/00 (2006.01)
B05D 3/06 (2006.01)
C09D 125/06 (2006.01)

(52) U.S. Cl.
CPC ........... *C09D 5/1668* (2013.01); *B05D 1/005* (2013.01); *B05D 3/067* (2013.01); *C09D 5/00* (2013.01); *C09D 125/06* (2013.01); *C08K 2201/019* (2013.01)

(58) Field of Classification Search
CPC ...... C09D 5/1668; C09D 5/00; C09D 125/06; B05D 1/005; B05D 3/067; C08K 2201/019
See application file for complete search history.

(56) References Cited

FOREIGN PATENT DOCUMENTS

CN 113493621 A 10/2021

OTHER PUBLICATIONS

Peng Liu, et al., Development of "Liquid-like" Copolymer Nanocoatings for Reactive Oil-Repellent Surface, ACS Nano, 2017, pp. 2248-2256, vol. 11.
Jigang He, Colorful—Roaming in the Polymer World, 2001, pp. 55.

*Primary Examiner* — Robert S Walters, Jr.
(74) *Attorney, Agent, or Firm* — Bayramoglu Law Offices LLC

(57) ABSTRACT

A method for preparing a transparent fluorine-free, super-lubricating and oil-proof coating includes: dissolving a sulfhydryl compound, a styrene copolymer, a low surface energy component, and a photoinitiator in an organic solvent, conducting a uniform stirring to obtain a mixture, coating the mixture onto a substrate, and conducting a curing under an ultraviolet lamp to obtain the transparent fluorine-free, super-lubricating and oil-proof coating. The coating has excellent adhesion resistance to various organic solvents with low surface tension and even liquids with high viscosity, and has excellent chemical stability and mechanical durability. The coating can be applied to various substrates such as glass, an aluminum sheet, a steel sheet, and a polymer without limitations of a use environment, maintains excellent adhesion resistance in the environment of air, oil, and water, and has wide applicability. Moreover, according to the method, various ways such as spraying, dip-coating and spin-coating can be used.

4 Claims, 9 Drawing Sheets

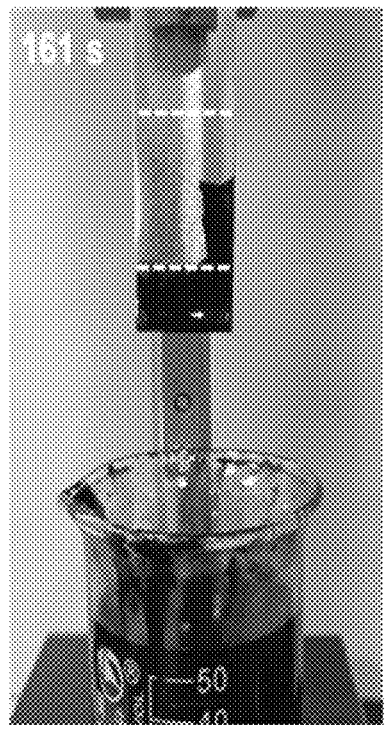
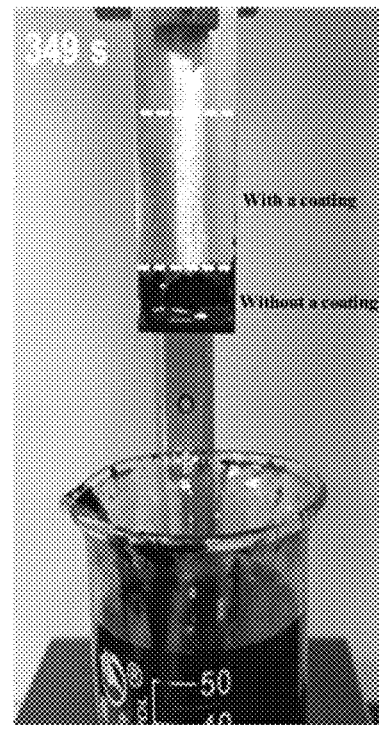
FIG. 5D  FIG. 5E
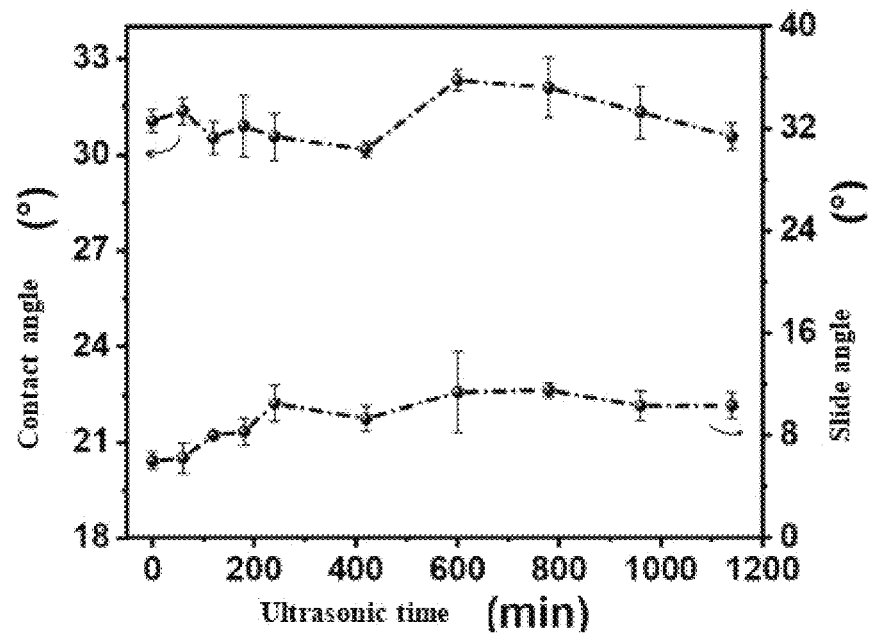
FIG. 6

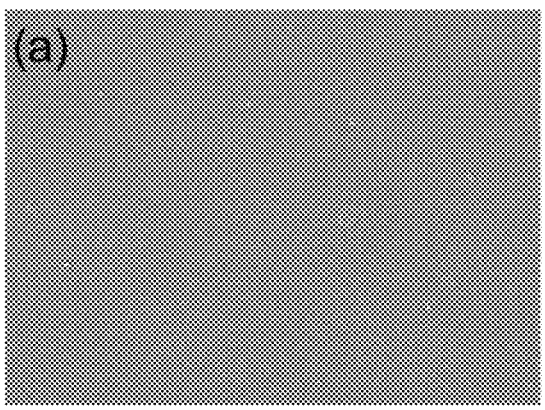
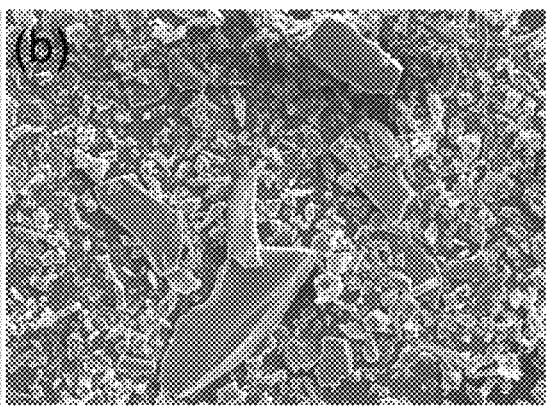
FIG. 10 A          FIG. 10B
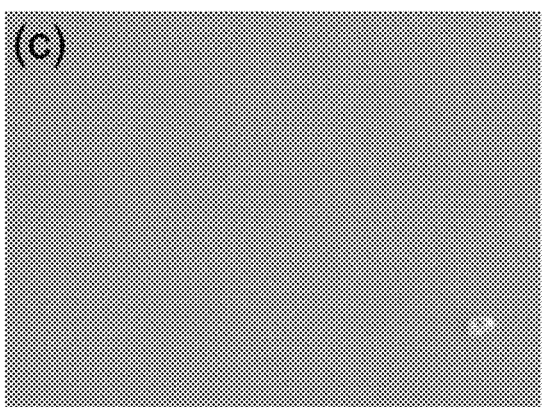
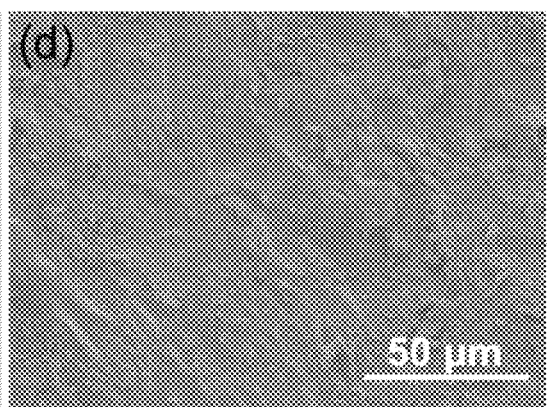
FIG. 10C          FIG. 10D
FIG. 11

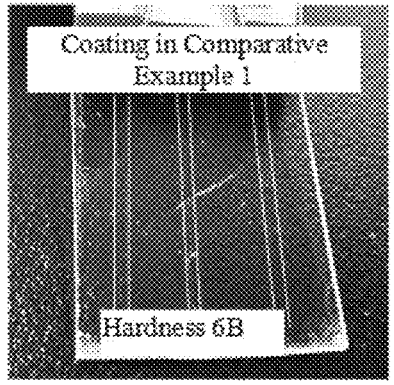 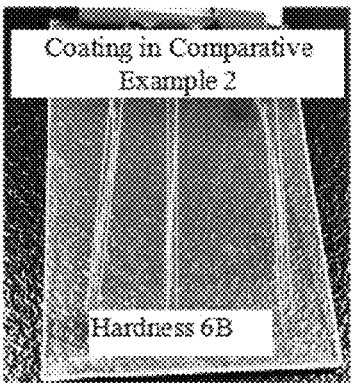 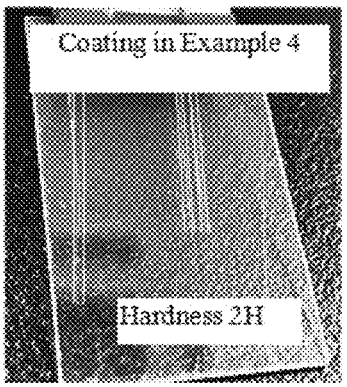
FIG. 12A  FIG. 12B  FIG. 12C
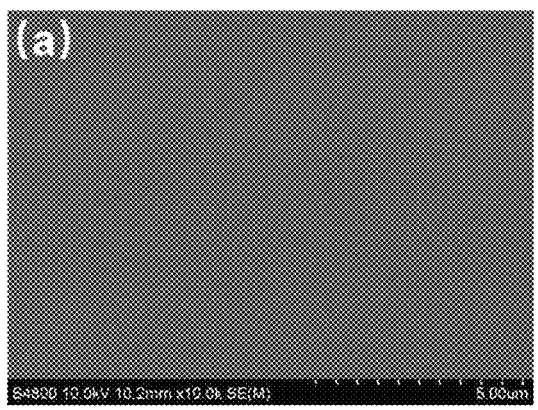 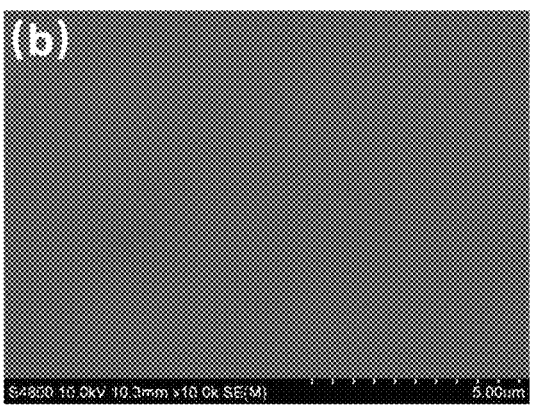
FIG. 13A  FIG. 13B
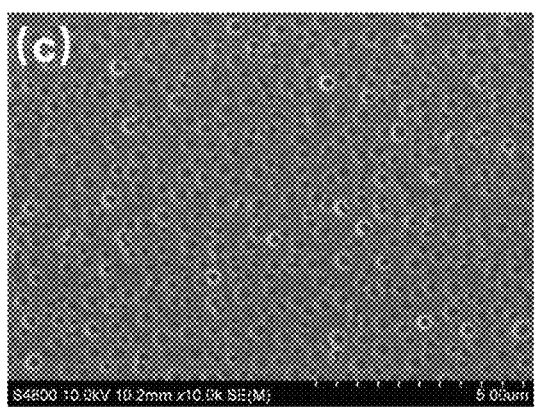 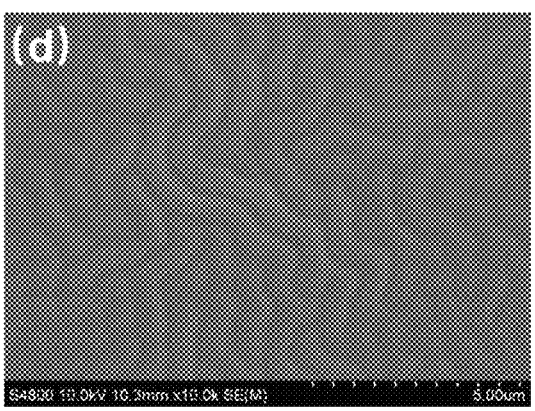
FIG. 13C  FIG. 13D

METHOD FOR PREPARING TRANSPARENT FLUORINE-FREE, SUPER-LUBRICATING AND OIL-PROOF COATING

CROSS REFERENCE TO THE RELATED APPLICATIONS

This application is based upon and claims priority to Chinese Patent Application No. 202210111036.1, filed on Jan. 29, 2022, the entire contents of which are incorporated herein by reference.

TECHNICAL FIELD

The present disclosure belongs to the field of novel polymer functional materials and polymer coatings, and specifically relates to a method for preparing a transparent fluorine-free, super-lubricating and oil-proof coating.

BACKGROUND

Theoretical research and practical application of a liquid repellent surface have been widely concerned in an antifouling field, nondestructive transportation, microfluidics, bioanalysis, liquid collection, microreactors, and other fields. In particular, with rapid development of a waterproof surface, dust and water-soluble pollutants can be rapidly removed. However, due to low surface tension of oil, an oil repellent surface is more difficult to prepare. Therefore, collection or separation of oil, especially oil with high viscosity, from oily wastewater is a great challenge. For example, when being spilled, crude oil sticks tightly to various surfaces, resulting in serious pollution to substrates and even failures of all devices, so that great economic losses are caused.

At present, three main strategies to prevent oil adhesion are used. According to a first strategy, a superoleophobic or superbiphobic material with a micro-nano rough structure is used. In general, the surface of the material is prepared from a fluorine-containing material. A fluorine-containing raw material is expensive and non-degradable, and has bioaccumulation and serious impacts on the global environment. In addition, the surface is relatively fragile, and has poor chemical stability and mechanical durability, and superoleophobicity and transparency cannot be met at the same time, so that practical application is further limited. According to a second strategy, a superhydrophilic or underwater superoleophobic material is prepared to prevent oil adhesion. However, the material can only be used in an underwater environment. According to a third strategy, inspired by common nepenthes, a material is prepared by injecting lubricating oil into a porous surface, and has the effect of preventing the adhesion of water and various oils with extremely low surface energy. In order to lock a lubricant, a substrate with a porous structure is required to be manufactured, the preparation process is complex, and an expensive device is in need. Moreover, a test droplet and the lubricant cannot be mixed. After use for a long time, the lubricant gradually volatilizes and loses. Therefore, it is urgent to develop other sustainable oil-proof materials for cleaning up spilled oil and collecting sticky oil.

SUMMARY

In order to solve the above problems, a "liquid-like" solid super-lubricating styrene copolymer coating based on a novel structural design is prepared in the present disclosure to prevent oil adhesion. Specifically, flexible segments in a novel interpenetrating polymer network structure can be used to serve as a liquid-like lubricating layer with wide surface tension. Due to chemical crosslinking, these molecular structures cannot be dissolved or replaced by an organic solvent in contact. Without the addition of fluorosilane, a styrene copolymer coating in the prior art can only have water resistance, and will be directly wetted by oil dirt, so that direct oil resistance cannot be achieved. In the present disclosure, without the addition of other micro-nano particles as an inorganic filler, the coating can maintain excellent toughness, mechanical strength and transparency at the same time. The coating not only can prevent the adhesion of liquids with high surface tension and low surface tension at the same time, but also has adhesion resistance to liquids with high viscosity, and maintains excellent chemical stability and mechanical durability. The coating can be applied to various substrates such as glass, an aluminum sheet, a steel sheet and a polymer for a long time, can overcome limitations of a use environment, and can maintain good adhesion resistance in air, water and oil. The coating does not contain fluorine, and can have excellent adhesion resistance to various organic solvents with low surface tension and even liquids with high viscosity such as crude oil and honey. Compared with commercial fluorinated coatings, the coating has better oil adhesion resistance and mechanical properties, is expected to be widely used in the fields of oil and gas pipeline transportation, microfluidics, antifouling and self-cleaning field, non-destructive transportation, liquid collection, sticky oil recovery and oil and water separation materials, and has a greater economic value.

In order to achieve the above objectives, the following technical schemes are adopted in the present disclosure.

A method for preparing a transparent fluorine-free, super-lubricating and oil-proof coating includes the following steps:

(1) dissolving a sulfhydryl compound, a styrene copolymer, a low surface energy component, and a photoinitiator in an organic solvent, conducting uniform stirring to obtain a mixed solution, and subjecting the mixed solution to standing for later use;

(2) coating the mixed solution in step (1) onto a clean substrate after cleaning; and (3) subjecting a coating in step (2) to photocuring under an ultraviolet lamp, and taking out the coating to obtain the transparent fluorine-free, super-lubricating and oil-proof liquid-like solid coating.

Further, in the mixed solution in step (1), the sulfhydryl compound, the styrene copolymer and the low surface energy component have a concentration of 1-10 wt %, 1-30 wt % and 1-15 wt % respectively.

Further, due to the styrene copolymer in step (1), the coating is endowed with excellent flexibility, so that the coating has good toughness and can be applied to a crimped substrate.

Further, the sulfhydryl compound in step (1) is pentaerythritol tetra(3-mercaptopropionate). The compound is used to undergo a reaction with the styrene copolymer under irradiation of an ultraviolet lamp, and mainly used for increasing the chemical crosslinking degree and participating in construction of an interpenetrating polymer network structure, so that adhesion resistance to liquids with high viscosity is achieved, and the hardness of the coating is improved.

Further, the low surface energy component in step (1) is a fluorine-free silicon-containing component with low surface energy.

Further, the low surface energy component in step (1) is hydroxyl silicon oil. Due to physical crosslinking between molecules of the hydroxyl silicon oil, a hydrogen bond is formed. Due to physical crosslinking is intertwined with chemical crosslinking generated by the styrene copolymer and the sulfhydryl compound, an interpenetrating polymer network structure is formed. The coating is endowed with excellent oil resistance and adhesion resistance.

Further, the photoinitiator in step (1) is a free radical initiator, namely benzoin dimethyl ether.

Further, the organic solvent in step (1) includes an aliphatic hydrocarbon, an aromatic hydrocarbon, a saturated alcohol, and a saturated ketone, and specifically includes one of chloroform, toluene, cyclohexane, and tetrahydrofuran.

Further, in step (2), the mixed solution is coated onto the substrate by drip-coating, spin-coating, spraying, or pulling dip-coating.

In the present disclosure, due to the used styrene copolymer, the coating is endowed with excellent flexibility, so that the coating has good toughness and can be applied to a crimped substrate. The used sulfhydryl compound is pentaerythritol tetra(3-mercaptopropionate). The compound is used to undergo a reaction with the styrene copolymer under irradiation of an ultraviolet lamp, and mainly used for increasing the chemical crosslinking degree and participating in construction of an interpenetrating polymer network structure, so that adhesion resistance to liquids with high viscosity is achieved, and the hardness of the coating is improved. As the used low surface energy component is hydroxyl silicon oil, due to physical crosslinking between molecules of the hydroxyl silicon oil, a hydrogen bond is formed. Due to chemical crosslinking with the styrene copolymer and the sulfhydryl compound, an interpenetrating polymer network structure is formed. The coating is endowed with excellent oil resistance and adhesion resistance.

The present disclosure has the following advantages:

(1) Various ways such as spraying, dip-coating and spin-coating can be used. The method has a simple process, convenient operation and a low cost.

(2) The prepared coating is transparent and free of fluorine, and the problems of high cost, low degradability and bioaccumulation caused by the use of a fluorine-containing substance in current oil-proof coating systems can be avoided.

(3) The coating can be applied to various substrates such as glass, an aluminum sheet, a steel sheet and a polymer without limitations of a use environment, and can be used in the environment of air, oil and water.

(4) The coating has excellent adhesion resistance to various organic solvents with low surface tension and even liquids with high viscosity such as crude oil and honey.

(5) The coating has a good binding force on various substrates.

(6) The coating has excellent chemical properties, mechanical stability and durability.

BRIEF DESCRIPTION OF THE DRAWINGS

FIGS. 5A-5E show crude oil resistance of a coating coated on an aluminum sheet substrate.

FIG. 6 is a diagram showing changes of the contact angle and creep angle of ethanol on the surface of a coating after ultrasonic treatment for 20 hours.

FIGS. 10A-10D show changes of the morphology of a polystyrene copolymer coating and a prepared coating before and after a loop erosion experiment.

FIG. 11 shows adhesion behaviors of cyclohexane on the surfaces of a styrene copolymer coating, a coating in Comparative Example 1, a coating in Comparative Example 2 and a coating in Example 4.

FIGS. 12A-12C show the hardness of a pencil on the coatings in Comparative Example 1, Comparative Example 2 and Example 4 in a hardness test.

FIGS. 13A-13D show electron microscopy images of the coatings prepared in Example 4, Comparative Example 1 and Comparative Example 2.

DETAILED DESCRIPTION OF THE EMBODIMENTS

The present disclosure is further described in detail below in conjunction with embodiments and accompanying drawings, but the embodiments of the present disclosure are not limited herein.

Mixed solutions of coatings are prepared according to proportions in Table 1.

| Component | Example 1 | Example 2 | Example 3 | Example 4 | Comparative Example 1 | Comparative Example 2 |
|---|---|---|---|---|---|---|
| Styrene copolymer | 20% | 29% | 25% | 22% | 22% | 22% |
| Sulfhydryl compound | 5% | 8% | 8% | 2% | 0 | 2% |
| Hydroxyl silicon oil | 5% | 2% | 12% | 1% | 1% | 0 |

In Examples 1~4 and Comparative Examples 1-2, a photoinitiator, namely benzoin dimethyl ether is separately added, and accounts for 1 wt %. In Example 1, a styrene copolymer is a methyl methacrylate-butadiene-styrene copolymer, a sulfhydryl compound is pentaerythritol tetra (3-mercaptopropionate), and an organic solvent is chloroform and accounts for 69 wt %. In Example 2, a styrene copolymer is an acrylonitrile-butadiene-styrene copolymer, a sulfhydryl compound is pentaerythritol tetra(3-mercaptopropionate), and an organic solvent is toluene and accounts for 60 wt %. In Example 3, a styrene copolymer is a styrene-isoprene copolymer, a sulfhydryl compound is pentaerythritol tetra(3-mercaptopropionate), and an organic solvent is cyclohexane and accounts for 54 wt %. In Example 4, a styrene copolymer is an acrylonitrile-isoprene-styrene copolymer, a sulfhydryl compound is pentaerythritol tetra (3-mercaptopropionate), and an organic solvent is tetrahydrofuran and accounts for 74 wt %. In Comparative Example 1 and Comparative Example 2, a styrene copolymer used is an acrylonitrile-isoprene-styrene copolymer. In Comparative Example 1, an organic solvent is tetrahydrofuran and accounts for 76 wt %. In Comparative Example 2, a sulfhydryl compound used is pentaerythritol tetra(3-mercaptopropionate), and an organic solvent is tetrahydrofuran and accounts for 75 wt %. The styrene copolymer, the sulfhydryl compound and the component with low surface energy were mixed and dissolved in the organic solvent according to the proportions as shown in Table 1 separately. The photoinitiator was added. The obtained mixed solutions were separately coated on the surface of a substrate by a spin-coating method. Photocuring was conducted to form films under an ultraviolet lamp (365 nm).

The following items are used for testing properties of the coatings in various examples and comparative examples on different substrates.

Test One: Adhesion Resistance of a Coating to Various Solutions

Figure 1:
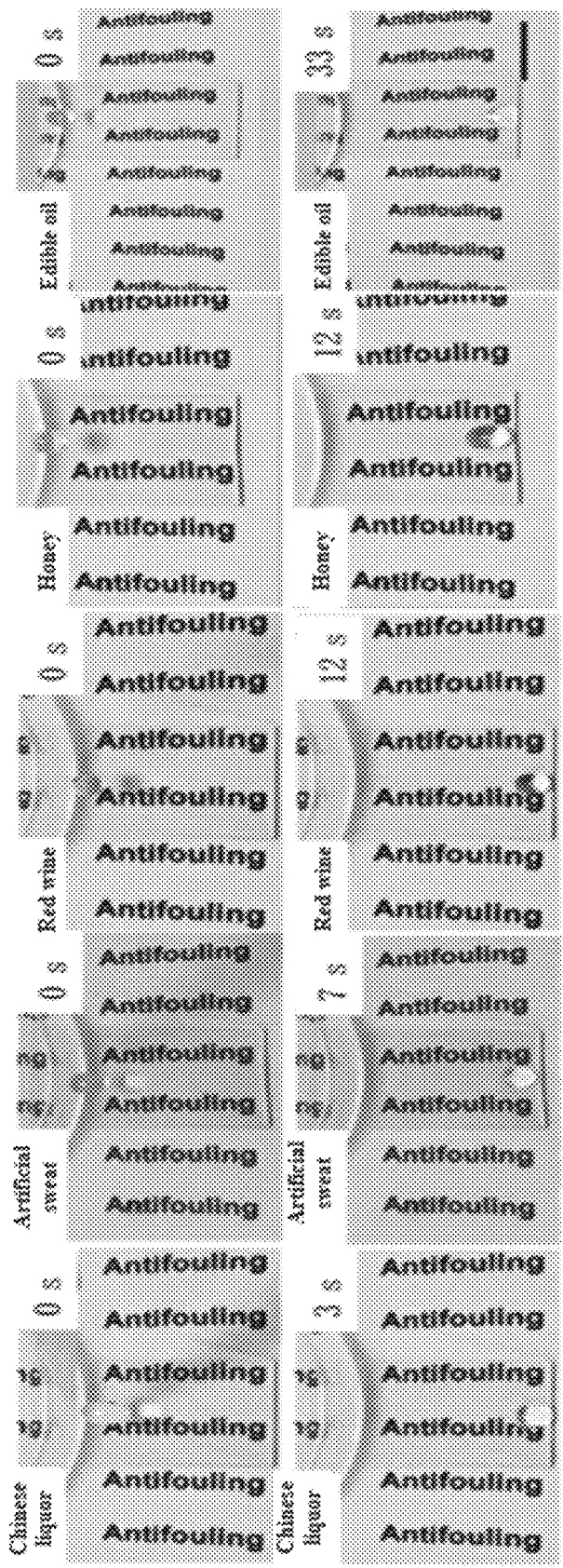
FIG. 1 shows sliding of various liquids on glass coated with a coating.

Glass coated with the coating in Example 2 was used, and different liquids such as Chinese liquor, artificial sweat, red wine, honey and edible oil were dropped on the coating on the surface of the glass from left to right. According to a state diagram as shown in FIG. 1, droplets of various solutions slide rapidly, including the honey with high viscosity. From FIG. 1, it can be seen that the coating has excellent adhesion resistance to various liquids.

Figures 2A, 2B:
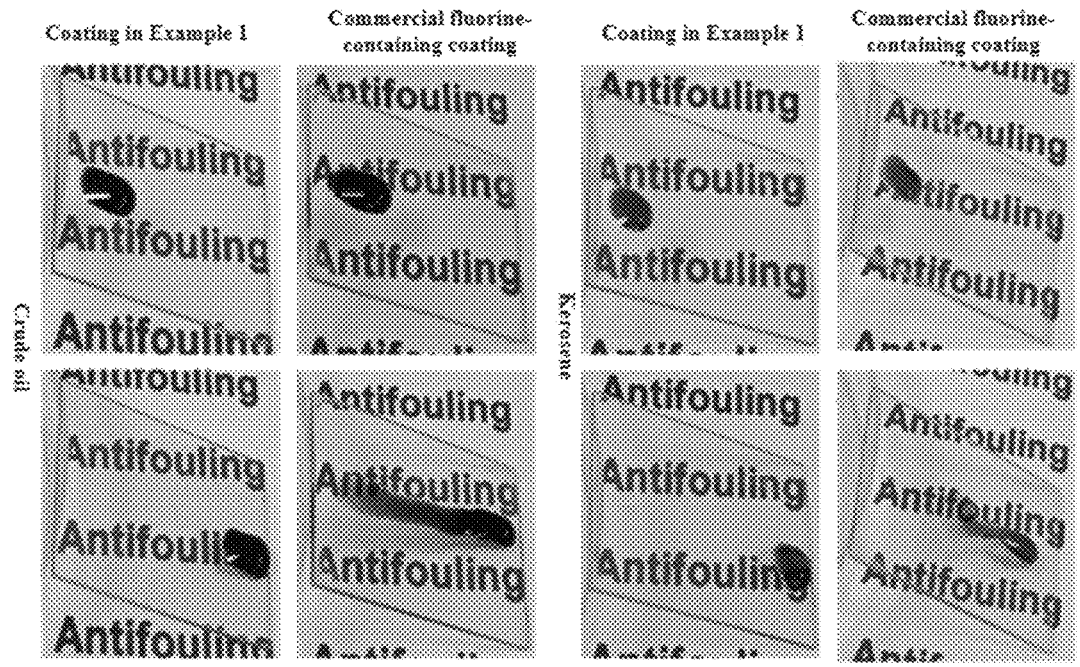
FIGS. 2A-2B are diagrams showing sliding of crude oil and kerosene on a prepared coating and a commercial fluorine-containing coating.

Test Two: Comparison with a Commercial Fluorine-Containing Coating in Properties Crude oil and kerosene were separately dropped onto the surface of glass coated with the coating in Example 1 and the surface of glass coated with a commercial fluorine-containing coating, and the sliding state was observed. As shown in FIGS. 2A-2B, both the crude oil and the kerosene can rapidly slide on the surface of the coating in Example 1, and wet the commercial fluorine-containing coating, indicating that the coating of the present disclosure has excellent adhesion resistance.

Test Three: Outdoor Durability

Figure 3:
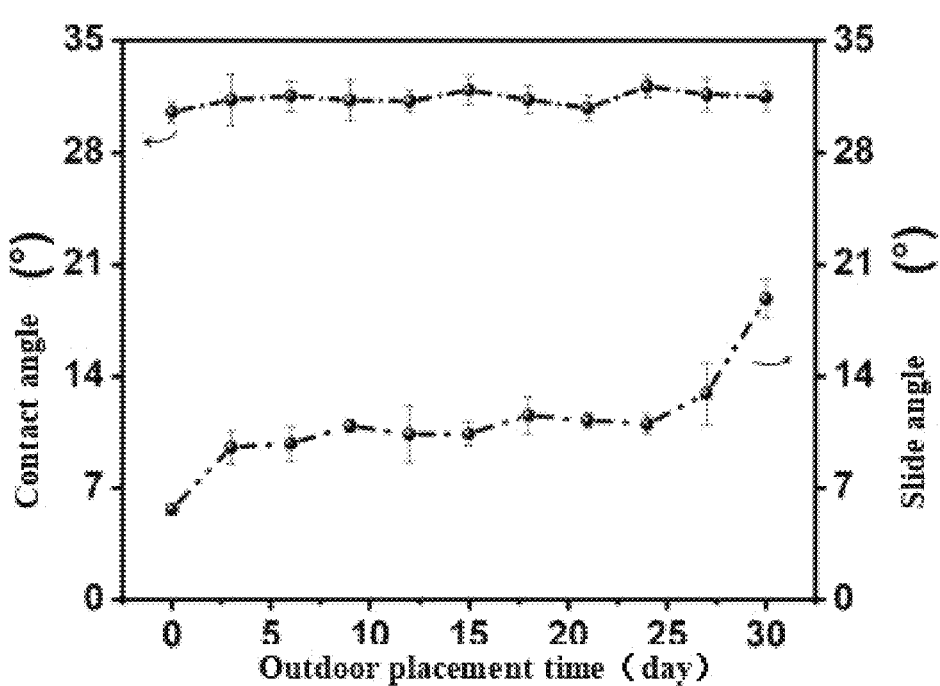
FIG. 3 is a diagram showing changes of the creep angle and contact angle of ethanol on the surface of a coating after exposure to wind, sun and rain in the outdoors for 30 days.

Glass coated with the coating in Example 1 was placed outdoors for exposure to wind, sun and rain for 30 days, and a diagram showing changes of the creep angle and contact angle of ethanol on the surface was observed. From FIG. 3, it can be seen that after outdoor placement for 30 days, the coating can still maintain good adhesion resistance to an organic solvent, indicating that the coating has excellent durability.

Test Four: Stability in an Oily Environment

Figure 4A:
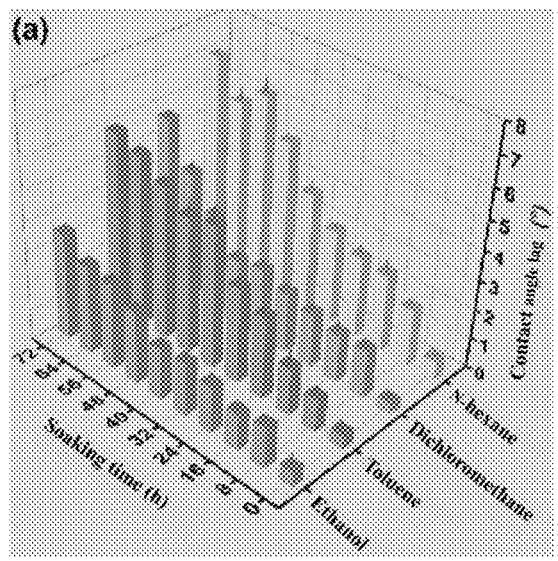
FIGS. 4A-4B are diagrams showing changes of the contact angle and creep angle of ethanol on the surface of a coating after soaking in four organic solvents for 72 hours.
Figure 4B:
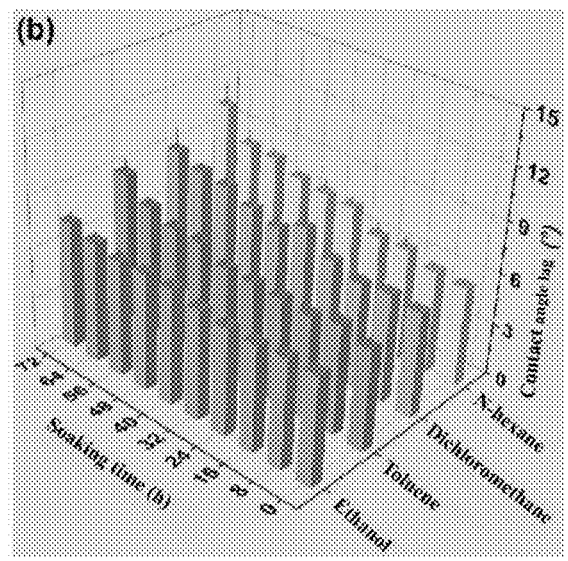
Figure 5A:
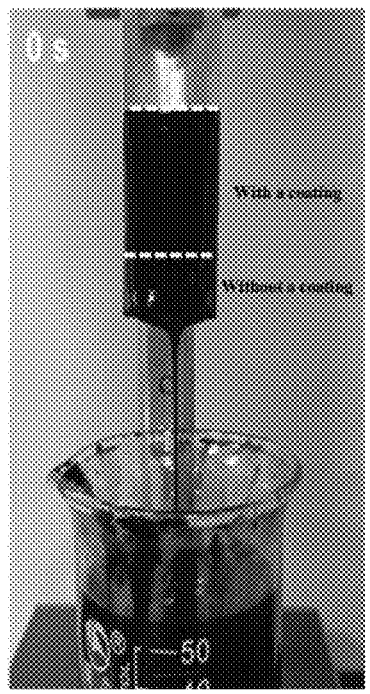
Figure 5B:
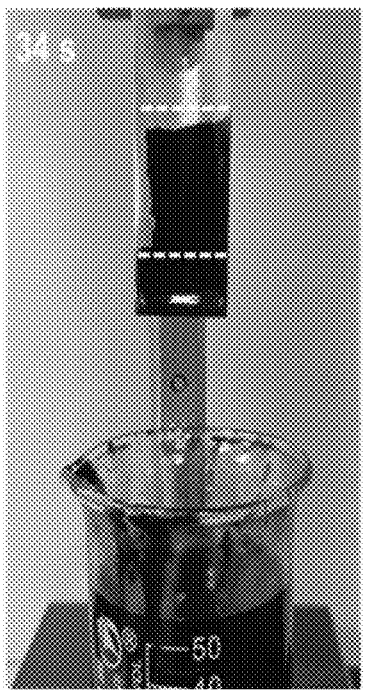
Figure 5C:
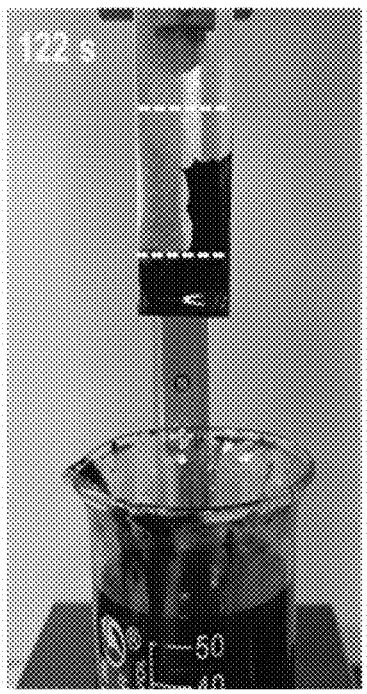

Glass coated with the coating in Example 3 was separately put in ethanol, toluene, dichloromethane and an n-hexane solution for soaking for 72 hours, and the creep angle and contact angle lag of the ethanol on the surface were measured every 8 hours. As shown in FIGS. 4A-4B, although soaking in an organic solution for 72 hours, the surface of the coating still has excellent oil resistance, indicating that the coating has excellent stability in an oily environment.

Test Five: Crude Oil Adhesion Resistance of a Coating

An aluminum sheet substrate coated with the coating in Example 4 was fixed to a pulling dipping machine, and dipped into a beaker filled with crude oil. After being covered with the crude oil, the aluminum sheet was pulled and placed vertically. As shown in FIGS. 5A-5E, the crude oil quickly slides on the part coated with the coating and tightly sticks to the uncoated part, indicating that the coating can prevent the adhesion of oil with high viscosity.

Test Six: Binding Force of a Coating in an Underwater Environment

A glass sheet coated with the coating in Example 4 was put in a beaker filled with water, and subjected to ultrasonic treatment in an underwater environment. The slide angle and contact angle of ethanol on the surface of the coating were observed at different times. As shown in FIG. 6, after the ultrasonic treatment for 20 hours, the creep angle and contact angle of the coating are slightly increased in comparison with initial values, but the coating still maintains excellent adhesion resistance to an organic solvent, indicating that the coating still has an excellent binding force in the underwater environment.

Test Seven: Antifouling Property of a Coating

Figures 7A, 7B:
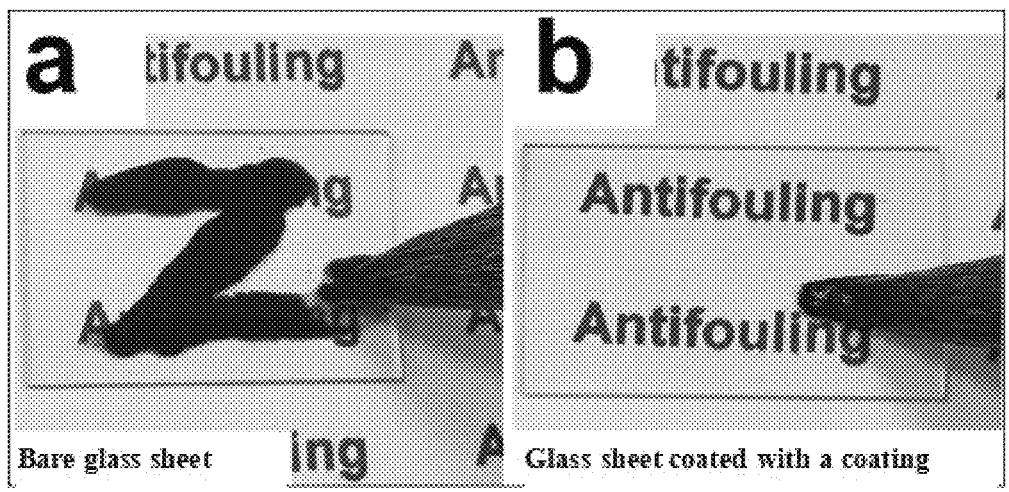
FIGS. 7A-7B are diagrams showing the state of ink on a bare sheet and a glass sheet coated with a coating, in which an excellent antifouling property is shown.

A writing brush dipped in ink was used to write on a glass sheet coated with the coating in Example 1 and a bare glass sheet separately. As shown in FIGS. 7A-7B, the glass sheet coated with the coating almost has no ink imprint, while the bare glass sheet has an obvious imprint, indicating that the coating of the present disclosure has an excellent antifouling property.

Test Eight: Mechanical Durability of a Coating

Figures 8A, 8B, 8C:
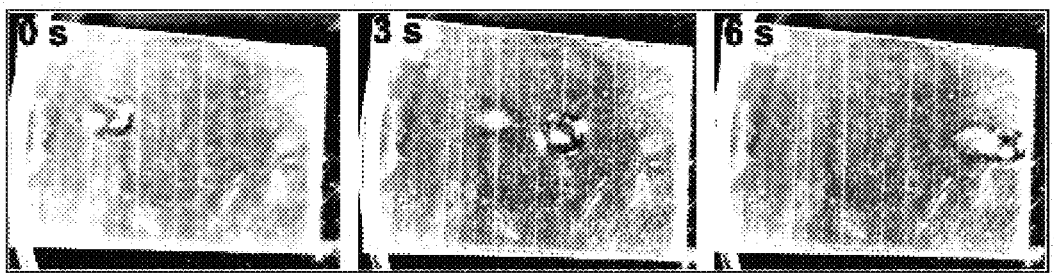
FIGS. 8A-8C are diagrams showing a sliding process of a cetane droplet on the surface of a slightly worn coating.

A scalpel was used to make scratches on the surface of a glass sheet coated with the coating in Example 2, a cetane drop was dropped on the scratched surface, and a sliding behavior was observed. As shown in FIGS. 8A-8C, the cetane droplet can still slide rapidly on the damaged surface of the coating, indicating that the coating has excellent mechanical properties.

Test Nine: Erosion Loop Experiment

Figure 9:
FIG. 9 is a diagram showing a physical device of a loop erosion experiment.

The coating prepared in Example 4 and a pure styrene copolymer coating (acrylonitrile-isoprene-styrene copolymer) were sequentially put in a bend pipe of a loop pipeline, and a loop sand erosion experiment was carried out (an experimental device figure is as shown in FIG. 9). Results are as shown in FIGS. 10A-10D, where FIGS. 10A-10B are figures showing the surface morphology of the polystyrene copolymer coating before and after erosion respectively, and FIGS. 10C-10D are figures showing the morphology of the prepared coating before and after erosion respectively. From the figures, it can be seen that after sand erosion, the polystyrene copolymer coating is completely re-crushed, while the prepared coating only has a slight scratch, indicating that due to a copolymer interpenetrating network formed by physical and chemical crosslinking, the wear resistance and impact resistance of the coating are greatly improved, and the coating is endowed with excellent mechanical properties.

Test Ten: Comparison of Oil Adhesion Resistance of Different Coatings

10 μL of cyclohexane dyed with oil red was separately dropped on the surfaces of a pure styrene copolymer coating (acrylonitrile-isoprene-styrene copolymer), the coating in Comparative Example 1, the coating in Comparative Example 2 and the coating in Example 4, and a sliding behavior of the cyclohexane droplet was observed. From a figure, it can be seen that the cyclohexane completely wets the styrene copolymer coating, the coating in Comparative Example 1 and the coating in Comparative Example 2, but slides rapidly on the surface of the coating prepared in Example 4 without any residue, further indicating that due to a thorough crosslinking structure, the coating is endowed with excellent oil adhesion resistance.

Test Eleven: Hardness Test of Different Coatings

A pencil hardness test was carried out on the coatings in Comparative Example 1, Comparative Example 2 and Example 4. From FIGS. 12A-12C, it can be seen that the surfaces of the coatings in Comparative Example 1 and Comparative Example 2 have a hardness of 6 B, while the surface of the coating in Example 4 has a hardness of 2 H, and the hardness level is increased by 9 levels, indicating that due to a thorough physical and chemical crosslinking structure, the hardness of the coating is improved, and the coating is endowed with good mechanical strength.

Test Twelve: Surface Morphology of Different Coatings

The surface morphology of a pure styrene copolymer coating (acrylonitrile-isoprene-styrene copolymer), the coating in Comparative Example 1, the coating in Comparative Example 2 and the coating in Example 4 was tested separately. As shown in FIGS. 13A-13D, FIG. 13A shows that the surface of the styrene copolymer coating has fine texture, verifying that the surface of the coating is of a polyphase separation structure. Compared with the styrene copolymer coating, the surface in FIG. 13B of the coating in Comparative Example 1 becomes smoother in morphology. However, when the styrene copolymer coating participates in a chemical crosslinking reaction, the surface in FIG. 13C of the coating in Comparative Example 2 has a uniform pore structure. The surface morphology in FIG. 13D of the coating in Example 4 was further tested, and it is found that when physical and chemical crosslinking reactions occur at the same time, the coating becomes fold in morphology. It is shown that different crosslinking structures have different kinds of surface morphology.

Test Thirteen: Sand Punching Test of Different Coatings

Figure 14:
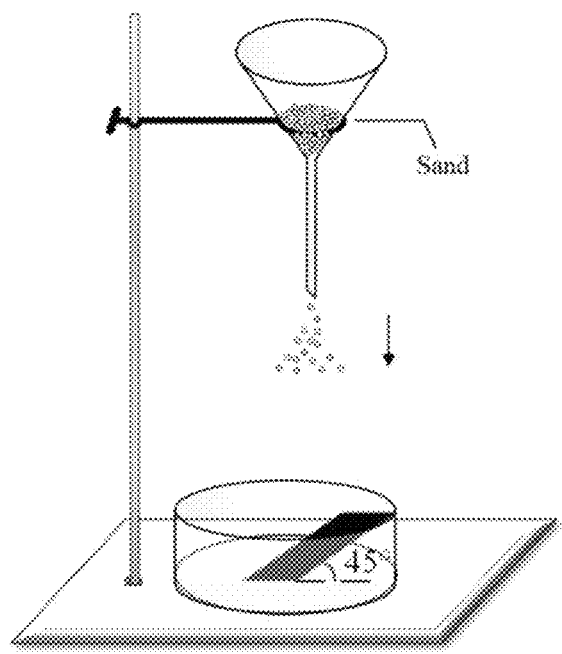
FIG. 14 is a diagram showing a sand punching device.
Figures 15A, 15B, 15C:
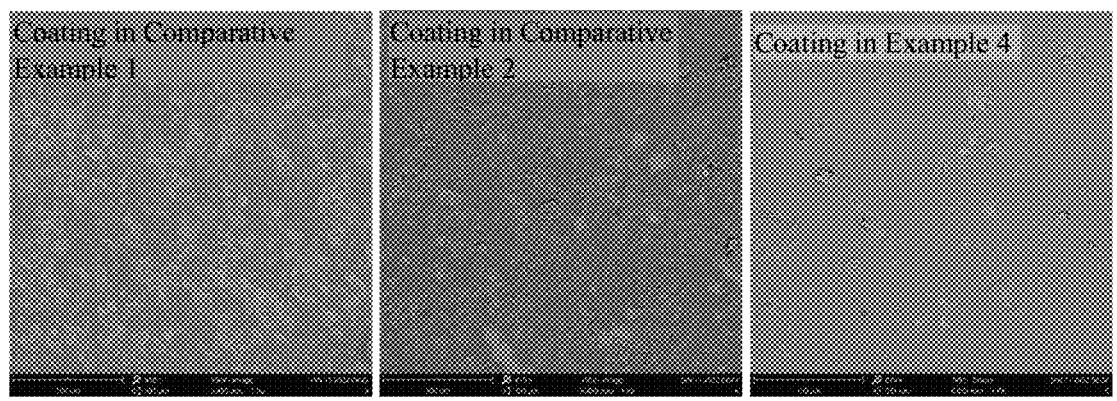
FIGS. 15A-15C show electron microscopy images of the surface morphology of the coatings prepared in Example 4, Comparative Example 1 and Comparative Example 2 after sand punching for 60 times.

A sand punching test was carried out on the coating in Comparative Example 1, the coating in Comparative Example 2 and the coating in Example 4 separately. A test device is as shown in FIG. 14. Samples were put at an inclination angle of 45°, 40 g of sand was punched at a height of 40 cm above the samples, and after cyclic punching was conducted for 60 times, the surface topography of different samples was observed. From FIGS. 15A-15C, it can be seen that the surfaces of the coatings in Comparative Example 1 and Comparative Example 2 are seriously damaged to different degrees, and by contrast, the surface morphology of the coating in Example 4 is only slightly worn, indicating that the coating in Example 4 has excellent mechanical properties.

Test Fourteen: Chemical Stability Test of Different Coatings

Figure 16A:
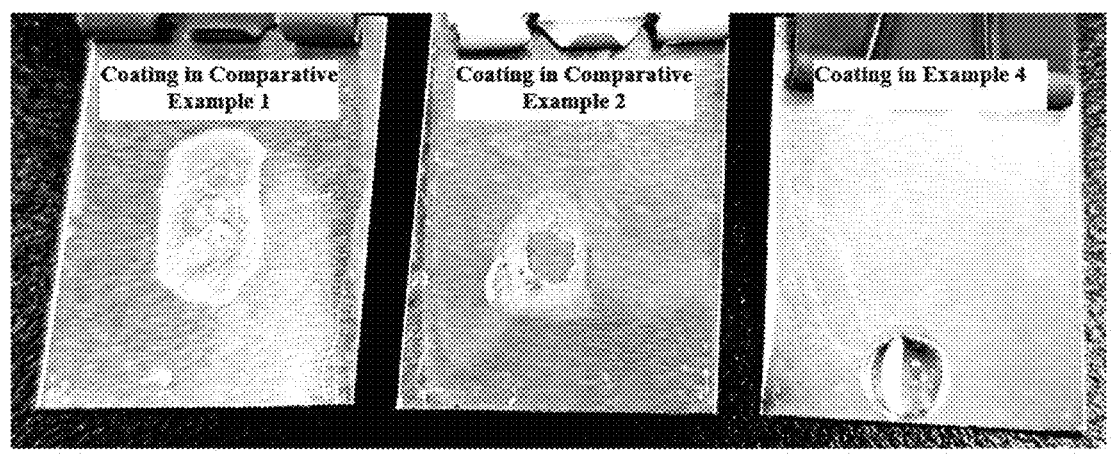
FIG. 16A shows the sliding state of 10 μL of a concentrated hydrochloric acid droplet dropped on the tilted coatings prepared in Example 4, Comparative Example 1 and Comparative Example 2.
Figure 16B:
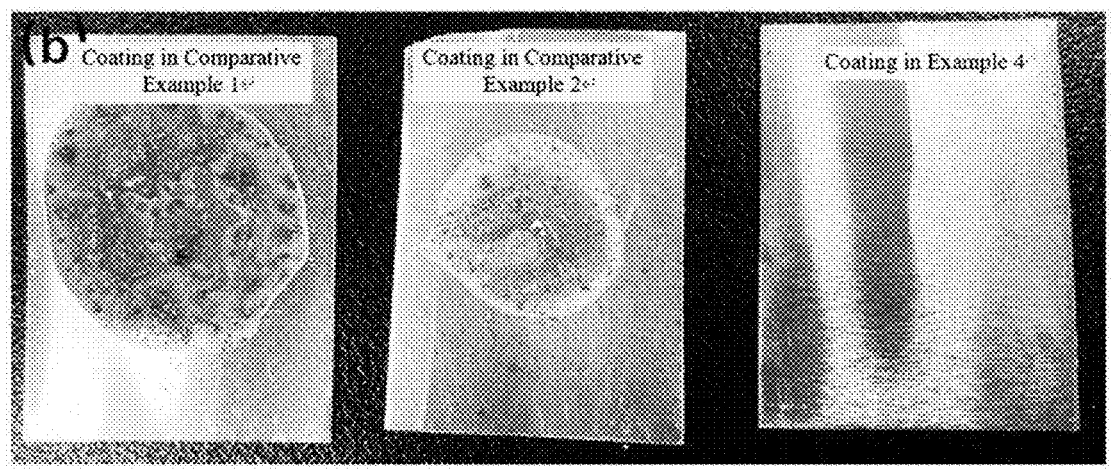
FIG. 16B shows the state of the surfaces of different coatings after 50 μL of a concentrated hydrochloric acid droplet is dropped on the surfaces of the flat coatings prepared in Example 4, Comparative Example 1 and Comparative Example 2 for 28 hours.

Different coatings were obtained by using an aluminum sheet as a substrate. 10 μL of a concentrated hydrochloric acid solution was dropped on the surfaces of the coating in Comparative Example 1, the coating in Comparative Example 2 and the coating in Example 4. As shown in FIG. 16A, a hydrochloric acid droplet immediately corrodes the coatings in Comparative Example 1 and Comparative Example 2 and slides on the surface of the coating in Example 4. Further, 50 μL of a hydrochloric acid droplet was dropped on the surfaces of the above coatings, and the surfaces of different coatings were observed 28 hours later. From FIG. 16B, it can be seen that the surfaces of the coatings in Comparative Example 1 and Comparative Example 2 are completely destroyed, while the coating in Example 4 still remains intact, indicating that the coating in Example 4 has excellent chemical corrosion resistance.

Therefore, according to the super-lubricating oil-proof coating prepared by the present disclosure, by using the styrene copolymer, the coating is endowed with good toughness, and convenience is provided for application to a crimped substrate. Further, an interpenetrating polymer network structure is constructed by combining chemical crosslinking and physical crosslinking. Under the case of no micro-nano particles as an inorganic filler, the coating can obtain excellent mechanical strength while maintaining good toughness. Flexible macromolecules in the novel interpenetrating polymer network structure have excellent fluidity and can be used as a liquid-like lubricating layer, so that adhesion of liquids with high surface tension and low surface tension is prevented. More importantly, adhesion resistance to liquids with high viscosity can also be achieved. In addition, due to high physical and chemical crosslinking degrees, the coating is endowed with excellent chemical stability and mechanical durability, and the service life of the coating is greatly prolonged.

It should be noted that the above embodiments are merely used to illustrate, rather than to limit the technical schemes of the present disclosure. Although the present disclosure is described in detail with reference to the preferred embodiments, it should be understood by a person of ordinary skill in the art that various improvements and modifications may also be made without departing from the principle of the present disclosure, and all the improvements and modifications shall be included within the scope of the claims of the present disclosure.

What is claimed is:

1. A method for preparing a transparent fluorine-free, super-lubricating and oil-proof coating, wherein the method comprises the following steps:
   (1) dissolving a sulfhydryl compound, a styrene copolymer, a low surface energy component, and a photoinitiator in an organic solvent, and conducting a uniform stirring to obtain a mixed solution;
   (2) coating the mixed solution in step (1) onto a clean substrate after cleaning; and
   (3) subjecting a coated substrate in step (2) to a photo-curing under an ultraviolet lamp, and taking out the coated substrate to obtain the transparent fluorine-free, super-lubricating and oil-proof coating;
   wherein in the mixed solution in step (1), the sulfhydryl compound, the styrene copolymer, and the low surface energy component have a concentration of 1-10 wt %, 1-30 wt %, and 1-15 wt % respectively;
   wherein the styrene copolymer is methyl methacrylate-butadiene-styrene copolymer or acrylonitrile-butadiene-styrene copolymer or styrene-isoprene copolymer or acrylonitrile-isoprene-styrene copolymer;
   wherein the sulfhydryl compound is pentaerythritol tetra (3-mercaptopropionate);
   wherein the low surface energy component is a fluorine-free silicon-containing component with a low surface energy, and the fluorine-free silicon-containing component with the low surface energy is hydroxyl silicone oil;

wherein the photoinitiator is a free radical initiator, and the free radical initiator is benzoin dimethyl ether.

2. The method according to claim 1, wherein the organic solvent comprises an aliphatic hydrocarbon, an aromatic hydrocarbon, a saturated alcohol, and a saturated ketone.

3. The method according to claim 2, wherein the organic solvent comprises toluene.

4. The method according to claim 1, wherein in step (2), the mixed solution is coated onto the clean substrate by drip-coating, spin-coating, spraying, or pulling dip-coating.

* * * * *